(12) United States Patent
Simpson

(10) Patent No.: US 9,115,739 B2
(45) Date of Patent: Aug. 25, 2015

(54) TOOL HANDLE ADAPTER

(71) Applicant: Kenneth Simpson, Detroit, MI (US)

(72) Inventor: Kenneth Simpson, Detroit, MI (US)

( * ) Notice: Subject to any disclaimer, the term of this patent is extended or adjusted under 35 U.S.C. 154(b) by 352 days.

(21) Appl. No.: 13/684,717

(22) Filed: Nov. 26, 2012

(65) Prior Publication Data

US 2013/0078030 A1    Mar. 28, 2013

Related U.S. Application Data

(63) Continuation-in-part of application No. 12/647,469, filed on Dec. 26, 2009, now abandoned.

(60) Provisional application No. 61/203,687, filed on Dec. 26, 2008, provisional application No. 61/203,688, filed on Dec. 26, 2008.

(51) Int. Cl.
  *B25G 3/04* (2006.01)
  *B25G 3/26* (2006.01)
  *F16B 9/02* (2006.01)

(52) U.S. Cl.
  CPC ........... *F16B 9/023* (2013.01); *Y10T 403/3933* (2015.01)

(58) Field of Classification Search
  CPC ............. F16B 7/18; F16B 7/182; B25G 3/00; B25G 3/02; B25G 3/04; B25G 3/26; B25G 3/30

USPC ........................ 15/145, 176.1, 176.3; 16/422; 56/400.04; 403/109.1, 296, 300, 301, 403/377, 378, 379.1, 379.3, 292

See application file for complete search history.

(56) References Cited

U.S. PATENT DOCUMENTS

| | | | | |
|---|---|---|---|---|
| 483,128 | A | * | 9/1892 | Beilmann et al. ............... 15/145 |
| 6,499,176 | B1 | * | 12/2002 | Hammond ...................... 15/145 |
| 7,028,375 | B1 | * | 4/2006 | Schaefer ......................... 15/145 |
| 7,798,755 | B2 | * | 9/2010 | Tomm ............................. 16/422 |
| 2004/0156674 | A1 | * | 8/2004 | Ko .................................. 403/292 |
| 2005/0176521 | A1 | * | 8/2005 | Burch et al. ................... 473/305 |

FOREIGN PATENT DOCUMENTS

| | | | | |
|---|---|---|---|---|
| CH | 102956 | * | 1/1924 | ............... B25G 3/30 |
| DE | 893 786 | * | 10/1953 | ............... B25G 3/02 |

* cited by examiner

*Primary Examiner* — Michael P Ferguson
(74) *Attorney, Agent, or Firm* — Vincent Re PLLC

(57) ABSTRACT

An adapter for releasably gripping the end of a long-handled tool handle. The adapter including a plurality of grippers threadably mounted around a tubular body. An engagement plug having both male and female threaded ends is removable secured to the end of the tubular body for engaging a tool's work head.

3 Claims, 3 Drawing Sheets

TOOL HANDLE ADAPTER

CROSS-REFERENCE TO RELATED APPLICATIONS

This application is a continuation-in-part to U.S. patent application filed Dec. 26, 2009 having Ser. No. 12/647,469 which claimed priority of U.S. Provisional Patent Application filed Dec. 26, 2008 having Ser. No. 61/203,687 and U.S. Provisional Patent Application filed Dec. 26, 2008 having Ser. No. 61/203,688.

FIELD OF THE INVENTION

The present invention relates to couplings and more particularly to an adapter for mounting a work head to an elongated tool handle.

BACKGROUND AND SUMMARY OF THE INVENTION

Presently, long handled hand tools, such as brooms, mops, and some paint rollers have a work head coupled to an elongated cylindrical handle. The work head includes the operative portion of the tool, e.g., the broom bristles or the paint applicator/roller. The work head is typically coupled to the handle through complementary threaded members formed on the end of the handle and a portion of the work head.

The coupling section of these long handled hand tools is frequently the weakest point of the tool and is a common location for the tool to break, which usually renders the tool useless for its intended purpose.

Furthermore, certain occupations, such as a janitor, require the user to have multiple long handled tools at his disposal at any given time. While it is possible to carry or otherwise transport multiple long handled tools (e.g., a flat broom, push broom, wet mop, dry mop, squeegee) simultaneously, these long handles frequently obstruct the user in his work.

There is therefore a need for a device that allows a user to both easily repair a broken long handled tool connection and to allow a person to use a single elongated tool handle for various work heads.

It is an advantage to provide an adapter that will readily grip substantially any cylindrical handle that can be inserted within the adapters handle inlet opening.

It is another advantage of the present invention to provide an adapter that can be easily configured to couple a single tool handle to a variety of tool work heads. To that end the present invention provides a reversible engagement plug having both male and female threaded ends. The engagement plug being removable secured to the end of the tubular body for engaging a tool's work head with either the male or female threaded end.

It is still another advantage to provide an adapter that will allow a tool handle with a broken fastening end to mate with a tool work head.

These and other objects, features and advantages of the present invention will become apparent from the following description when viewed in accordance with the accompanying drawings.

BRIEF DESCRIPTION OF THE DRAWINGS

The description refers to the accompanying drawings in which like reference characters refer to like parts throughout the several views, and in which.

DETAILED DESCRIPTION OF THE INVENTION

Figure 1:
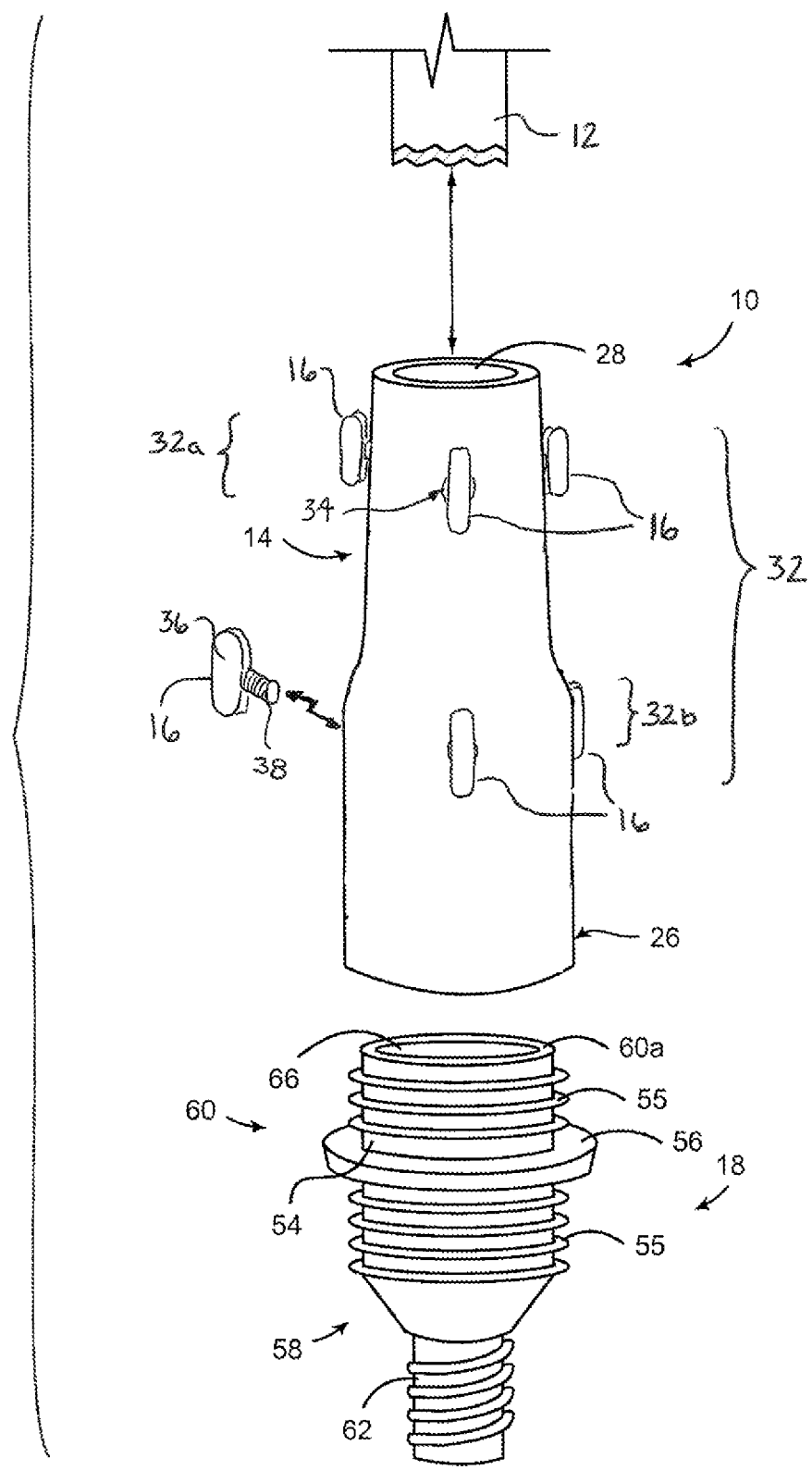
FIG. 1 is a partially exploded perspective view of the present invention.

Referring now to FIGs., the present invention is an adapter 10 for coupling a cylindrical-shaped elongated handle 12 to a work head 13, such as a bristle block of a push broom.

Adapter 10 includes a body 14 having at least one gripper 16 and an engagement plug 18. Body 14 is preferably approximately four to eight inches long and has a tubular shape with a rigid wall 20 that circumscribes and defines an interior cavity 22. Wall 20 and cavity 22 run from a top handle-receiving end 24 to a bottom plug-receiving end 26. At top end 24, wall 20 is configured such that the upper portion 28 of cavity 22 is approximately $15/16$th of an inch to one and half inches in diameter to readily receive a conventional $15/16$ inch tool handle 12 in a telescopic relationship.

From the lower portion of top end 24, body 14 flares radially outwardly at the approximate middle of its length to the bottom end 26. At the bottom end 26, wall 20 is configured such that the bottom portion 30 of cavity 22 is approximately $1^{1/8}$ inches in diameter. In the preferred embodiment, bottom end 26 is tapped, having a female screw thread 31 formed along the interior wall defining cavity bottom 30.

Figure 2:
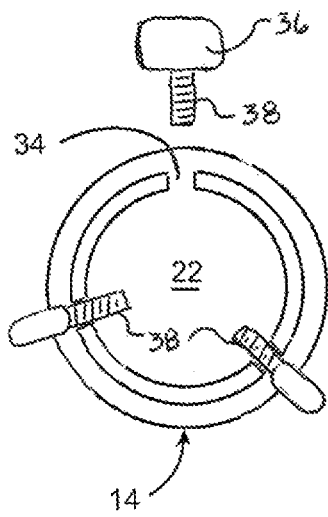
FIG. 2 is top view of the handle-engaging body portion of the present invention.

Body 14 includes a handle gripping portion 32 with at least one gripper 16 and a gripper-receiving aperture 34 formed through wall 20. In the preferred embodiment, two rows of three grippers 16 and apertures 34 are equally spaced around gripping portion 32. Each gripper 16 preferably has a thumb-screw configuration, having an enlarged, relatively flat head 36 on one end and an externally-threaded post 38 on the other end. Each gripper-receiving aperture includes an internal threading complementary to the threaded post 38. As shown in FIG. 2, each post 38 has sufficient length to project into cavity 22 to grip an inserted handle. In the embodiment illustrated in the FIGs., two spaced rows 32a, 32b of grippers and apertures ensure that any handle inserted within cavity 22 has up to six grippers 16 engaging the handle to ensure a rigid coupling between the body 14 and inserted handle.

Figure 5:
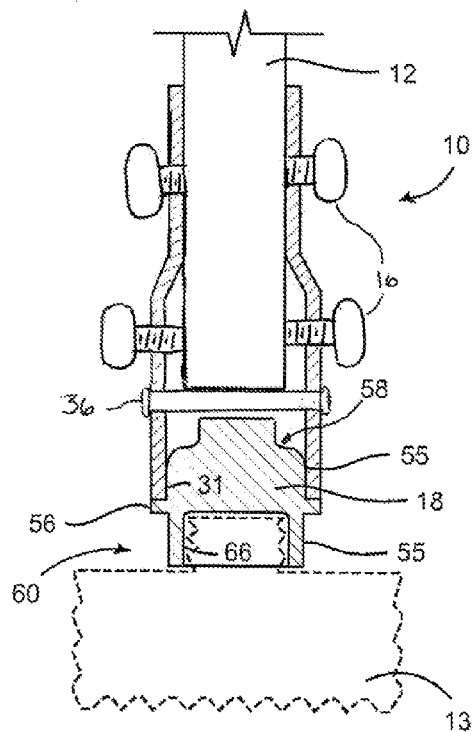
FIG. 5 is a side sectional view of an alternate embodiment including a transverse pin providing a seat for the handle.

In one non-limiting embodiment, shown in FIG. 5, a cross beam 36 runs transversely through cavity 22 beneath the lower-most row 32b of grippers, but above the female threading 31. Beam 36 is preferably a pin which passes through the centerline of the cylindrical cavity 22 and operates as a positive stop or seat for any handle inserted through opening 28.

Adapter 10 further includes an engagement plug 18. Engagement plug 18 has a generally cylindrical body or core 54 having a male screw thread or threading 55 on its outer surface. Threading 55 is sized complementary to female threading 31 of body 14. An annular ring 56 extends radially outwardly from core 54 separating the core 54 and threading 55 into substantially equal halves. Ring 56 preferably projects outwardly to have an outer diameter equal to the outer diameter of lower body portion 26. In this manner, ring 56 operates as a stop and prevents the plug 18 from being inserted too far into cavity 22 while tightening threaded portions 31, 55.

Ring 56 further divides plug 18 into a male engagement end 58 and a female engagement end 60. Male engagement end 58 includes a cylindrical male threaded boss 62 extending axially from the end of core 54. In the preferred embodiment, boss 62 is sized/threaded to be received within a commonly used work head thread, such as ¾ inch ACME threading with five threads per inch. Similarly, female engagement end 60 has a cylindrical opening 66 formed axially into its end face 60*a*. Like, boss 62, opening 66 is preferably tapped to receive an industry standard threading, such as the aforementioned ¾-5 ACME thread.

Figure 4:
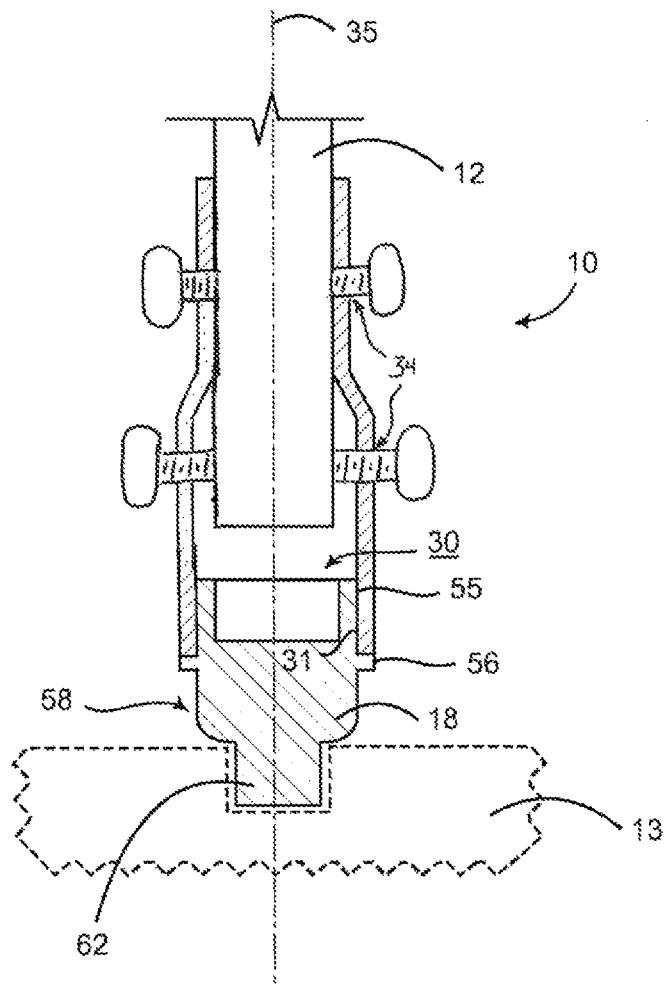
FIG. 4 is side section view of the present invention coupled to the end of a handle with a female fastener end of the engagement plug extending therefrom.
Figure 3:
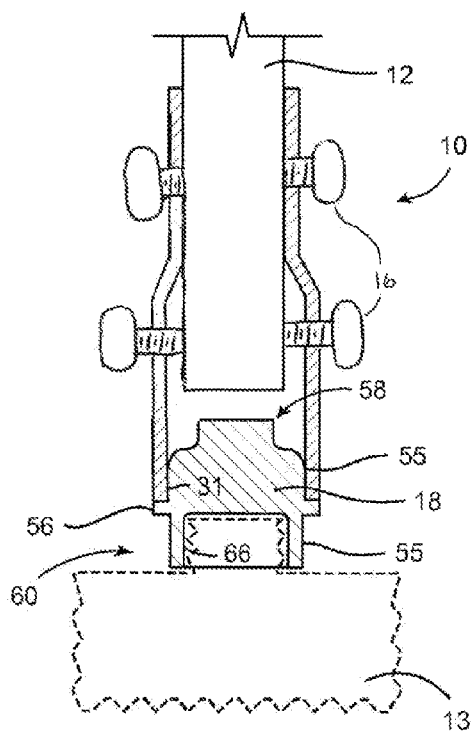
FIG. 3 is a side section view of the present invention coupled to the end of a handle with a male fastener end of engagement plug extending therefrom.

As shown in FIGS. 3 and 4, engagement plug 18 can be threadably mounted within bottom end 26 to either present the male engagement boss 62 or the female engagement opening 66 for engagement with a work head 13. As shown, the plug 18 is tightened into body 14 until ring 56 abuts the bottom-most end of tubular body 14.

In operation, a handle 12 is inserted through upper opening 28, the equally spaced grippers 16 are tightened into the cavity 22 around the handle until their posts 38 grip the outer surface of the handle and lock the handle within the cavity. That is, the combined gripping pressure of the equally spaced grippers 16 prevents any radial or axial movement of the handle 12 within cavity 22.

In still other embodiment, threading 55 and 31 may be replaced with a quick-disconnect fastener, such as a spring-biased transverse pin that locks the engagement plug within the cavity opening 30.

From the foregoing description, one skilled in the art will readily recognize that the present invention is directed to an improved device for coupling a work head to the end of an elongated handle. It should be appreciated that the sizes disclosed are exemplary and should not be construed to limit the scope of the present invention. Further, while the present invention has been described with particular reference to various preferred embodiments, one skilled in the art will recognize from the foregoing discussion and accompanying drawing that changes, modifications and variations can be made in the present invention without departing from the spirit and scope thereof.

The invention claimed is:

1. An adapter for mounting to the end of an elongated tool handle, comprising:
   a body having an elongated tubular wall which defines an inner cavity and comprising a first orifice defined by a first end of the elongated tubular wall for receiving the elongated tool handle and a second orifice defined by a second end of the elongated tubular wall;
   a first set of three threaded grippers passing through an outer surface of said wall at a first common axial location, the first set of threaded grippers being spaced radially around the body;
   a second set of three threaded grippers passing through the outer surface of said wall at a second common axial location, the second set of threaded grippers being spaced radially around the body, wherein the two sets of threaded grippers securely fasten the body to the elongated tool handle; and
   an engagement plug comprising:
   a cylindrical core;
   a male tool fastener end comprising threading upon an outer diameter of said engagement plug for engaging a female work head of a tool, wherein said male tool fastener end comprises a smaller diameter than said cylindrical core;
   a female tool fastener end comprising threading upon an inner diameter of said cylindrical core for engaging a male work head of a tool;
   a first threaded section formed upon an outside of the cylindrical core adjacent said male fastener end and configured to be threaded into the second orifice; and
   a second threaded section formed upon an outside of the cylindrical core adjacent said female fastener end and configured to be threaded into the second orifice;
   wherein said second orifice comprises threading upon an inner diameter of said second orifice and is configured to allow selective reversal of the engagement plug to provide either said male tool fastener end and a female tool fastener end at an end of said adaptor for tool engagement.

2. An adapter as defined in claim 1, wherein said engagement plug includes an annular stop extending radially from an approximate center of said cylindrical core, said annular stop abuttingly engaging said second end of said body when said engagement plug is threaded within said second orifice.

3. An adapter as defined in claim 1, further comprising a pin transversely spanning said inner cavity, said pin providing a stop for full engagement of said elongated tool handle within said inner cavity.

* * * * *